(12) United States Patent
Cao et al.

(10) Patent No.: US 12,210,826 B2
(45) Date of Patent: Jan. 28, 2025

(54) METHOD AND DEVICE FOR PRESENTING PROMPT INFORMATION AND STORAGE MEDIUM

(71) Applicant: FUJITSU LIMITED, Kawasaki (JP)

(72) Inventors: Yiling Cao, Beijing (CN); Zhongguang Zheng, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 17/695,857

(22) Filed: Mar. 16, 2022

(65) Prior Publication Data

US 2022/0300708 A1 Sep. 22, 2022

(30) Foreign Application Priority Data

Mar. 19, 2021 (CN) .......................... 202110295319.1

(51) Int. Cl.
*G06F 40/253* (2020.01)
*G06F 40/169* (2020.01)
(Continued)

(52) U.S. Cl.
CPC .......... *G06F 40/279* (2020.01); *G06F 40/253* (2020.01); *G06F 40/30* (2020.01); *G06N 3/04* (2013.01)

(58) Field of Classification Search
CPC ......... G10L 15/16; G10L 15/01; G10L 15/02; G10L 2015/025; G10L 21/003;
(Continued)

(56) References Cited

U.S. PATENT DOCUMENTS 11,043,214 B1 * 6/2021 Hedayatnia ............ G06N 20/10
2021/0034701 A1 2/2021 Fei et al.
(Continued)

FOREIGN PATENT DOCUMENTS

CN 112084383 A 12/2020
CN 112434533 A 3/2021

OTHER PUBLICATIONS

Fang Zheng Fangzheng@IIE AC CN et al: "High Quality Candidate Generation and Sequential Graph Attention Network for Entity Linking", Proceedings of the 28th ACM Joint Meeting On European Software Engineering Conference and Symposium On the Foundations of Software Engineering, ACM, New York, NY, USA, Apr. 20, 2020 (Apr. 20, 2020), pp. 640-650, XP058639091.
(Continued)

*Primary Examiner* — Paras D Shah
*Assistant Examiner* — Kristen Michelle Masters
(74) *Attorney, Agent, or Firm* — XSENSUS LLP

(57) ABSTRACT

A method of presenting prompt information by utilizing a neural network which includes a BERT model and a graph convolutional neural network (GCN), comprising: generating a first vector based on a combination of an entity, a context of the entity, a type of the entity and a part of speech of the context by using BERT model; generating a second vector based on each of predefined concepts by using BERT model; generating a third vector based on a graph which is
(Continued)

generated based on the concepts and relationships thereamong, by using GCN; generating a fourth vector by concatenating the second and third vectors; calculating semantic similarity between the entity and each concept based on the first and fourth vectors; determining, based on the first vector and the semantic similarity, that the entity corresponds to one of the concepts; and generating the prompt information based on the determined concept.

20 Claims, 5 Drawing Sheets

(51) Int. Cl.
*G06F 40/279* (2020.01)
*G06F 40/30* (2020.01)
*G06N 3/04* (2023.01)
*G06N 3/045* (2023.01)

(58) Field of Classification Search
CPC ......... G10L 25/30; G10L 25/90; G10L 25/60; G09B 19/06
See application file for complete search history.

(56) References Cited

U.S. PATENT DOCUMENTS

2021/0073290 A1* 3/2021 Hunter ................... G06N 3/084
2021/0374141 A1* 12/2021 Zhao ................. G06F 16/24578

OTHER PUBLICATIONS

Jeong Chanwoo et al: "A context-aware citation recommendation model with BERT and graph convolutional networks", Scientometrics, Springer International Publishing, Cham, vol. 124, No. 3, Jul. 13, 2020 (Jul. 13, 2020), pp. 1907-1922, XP037203139.
U Zhibin et al: "VGCN-BERT: Augmenting BERT with Graph Embedding for Text Classification", Apr. 8, 2020 (Apr. 8, 2020), Arxiv.org, Cornell University Library, 201 Olin Library Cornell University Ithaca, NY 14853, pp. 369-382, XP047547106.
Extended European Search Report issued Jul. 29, 2022, in corresponding European Patent Application 22162112.1, 6pp.
Yamada et al., "Global Entity Disambiguation with Pretrained Contextualized Embeddings of Words and Entities", Sep. 1, 2019, 8pp.
Chinese Office Action issued Aug. 16, 2024, in corresponding Chinese Patent Application No. 202110295319.1, 15pp.

* cited by examiner

| $L_1 L_2 \ldots$ | $[E] M_1 M_2 \ldots [E/]$ | $R_1 R_2 \ldots$ |
|---|---|---|
| $POS_1 POS_2 \ldots$ | Entity Type$_x$ | $POS_1 POS_2 \ldots$ |

METHOD AND DEVICE FOR PRESENTING PROMPT INFORMATION AND STORAGE MEDIUM

CROSS-REFERENCE TO RELATED APPLICATION

This application is based upon and claims the benefit of priority of the prior Chinese Patent Application No. 202110295319.1, filed on Mar. 19, 2021, the entire contents of which are incorporated herein by reference.

FIELD

The present disclosure generally relates to entity disambiguation technology, and in particular to a method and device for presenting prompt information about an entity in a text to a user by using the entity disambiguation technology, and a storage medium.

BACKGROUND

In actual language environments, there are often cases where an entity name corresponds to several concepts. For example, an entity name "apple" in a text may refer to a kind of fruit or Apple Inc. In order to eliminate the ambiguity caused by the same entity name, entity disambiguation technology has been proposed and developed.

With the entity disambiguation technology, mention (i.e., entity) in the context is linked to an appropriate concept in a knowledge map. The entity disambiguation technology plays a basic role in many fields such as question answering, semantic search and information extraction. A concept refers to something that is distinguishable and exists independently. Different concepts included in the knowledge map are connected with one another. For example, there are two famous persons with similar names, Michael Jeffrey Jordan who is a basketball star and Michael Owen Jordan who is a leader in machine learning. Therefore, there may be two concepts in the knowledge map, which are "a basketball star Michael Jeffrey Jordan" and "an expert in machine learning Michael Owen Jordan". In addition, in the knowledge map, there may be multiple sports concepts associated with "a basketball star Michael Jeffrey Jordan" and a number of computer technology concepts associated with "an expert in machine learning Michael Owen Jordan". In a case that an entity "Michael Jordan" appears in a text, it is required to determine whether the entity refers to "a basketball star Michael Jeffrey Jordan" or "an expert in machine learning Michael Owen Jordan" in the knowledge map based on the context of the text.

After determining the entity mentioned in the text to correspond to a specific concept using the entity disambiguation technology, prompt information may be provided to the user based on the determined concept, so that the user may understand correct meaning of the entity. For example, for an entity "apple" in a text "Apple released a new mobile phone today . . . " prompt information such as "Apple: an American high-tech company whose representative products include iPhone . . . " may be provided to the user.

However, due to high complexity of natural language, the entity disambiguation technology faces a challenge of how to identify correct meaning of an entity in the context and associate the entity with a proper concept in the knowledge map.

At present, there are mainly two types of entity disambiguation methods. One type is to model the entity disambiguation problem using a ranking model and the other type is to model the entity disambiguation problem using a classification model.

The method using the ranking model includes two steps of candidate concept generation and candidate concept ranking. A simple rule is usually used in the step of candidate concept generation, which often results in an inability to filter out proper candidate concepts, thereby resulting in a cascading error in the subsequent ranking step.

The method using the classification model models the entity disambiguation problem as a single label text classification task. For example, a model is described in "Medical concept normalization in social media posts with recurrent neural networks", Elena Tutubalina et al., Journal of Biomedical informatics, June 2018, which includes a neural network part and an auxiliary feature part. In the part of neural network, an entity is encoded by a gated recurrent unit (GRU) network and an attention mechanism network. In the part of auxiliary features, a model is enhanced based on TF-IDF similarity and Word2Vec similarity. However, in this model, the Word2Vec similarity feature does not have sufficient semantic information, and thus it is difficult to correctly determine a semantic level similarity between entity and concept.

SUMMARY

In order to solve one or more problems in the conventional technology, a new method using a classification model is provided according to the present disclosure. With the method, an entity is encoded by a Bidirectional Encoder Representations and Transformers (BERT) model, and a character similarity and a semantic similarity are used as auxiliary features. The method according to the present disclosure may increase a probability of associating the entity mentioned in the text with a correct concept in the knowledge map, so as to provide a user with more accurate prompt information.

According to an aspect of the present disclosure, a computer-implemented method of presenting prompt information to a user who is viewing an electronic text by utilizing a neural network is provided. The neural network includes a BERT model and a graph convolutional neural network. The method includes: inputting the electronic text, information related to the electronic text and multiple predefined concepts to the neural network, where the electronic text includes an entity and a context of the entity, the information related to the electronic text includes a type of the entity and a part of speech of the context, and the concept is in text form; generating a first vector (V2) based on a combination of the entity, the context, the type of the entity and the part of speech of the context by using the BERT model; generating a second vector (V4) based on each of the multiple concepts by using the BERT model; generating a third vector (V5) based on a graph by using the graph convolutional neural network, where the graph is generated based on the multiple concepts and relationships among the concepts; generating a fourth vector (V6) by concatenating the second vector (V4) and the third vector (V5); calculating a semantic similarity between the entity and each of the multiple concepts based on the first vector (V2) and the fourth vector (V6); determining, based on the first vector (V2) and the semantic similarity, that the entity corresponds to one of the multiple concepts; and generating the prompt information to be presented to the user based on the determined concept corresponding to the entity.

According to another aspect of the present disclosure, a device for presenting prompt information to a user who is viewing an electronic text by utilizing a neural network is provided. The neural network includes a BERT model and a graph convolutional neural network. The device includes a memory storing a computer program and one or more processors. The processors execute the computer program to perform operations of: inputting the electronic text, information related to the electronic text and multiple predefined concepts to the neural network, where the electronic text includes an entity and a context of the entity, the information related to the electronic text includes a type of the entity and a part of speech of the context, and the concept is in text form; generating a first vector (V2) based on a combination of the entity, the context, the type of the entity and the part of speech of the context by using the BERT model; generating a second vector (V4) based on each of the multiple concepts by using the BERT model; generating a third vector (V5) based on a graph by using the graph convolutional neural network, where the graph is generated based on the multiple concepts and relationships among the concepts; generating a fourth vector (V6) by concatenating the second vector (V4) and the third vector (V5); calculating a semantic similarity between the entity and each of the multiple concepts based on the first vector (V2) and the fourth vector (V6); determining, based on the first vector (V2) and the semantic similarity, that the entity corresponds to one of the multiple concepts; and generating the prompt information to be presented to the user based on the determined concept corresponding to the entity.

According to another aspect of the present disclosure, a device for presenting prompt information to a user who is viewing an electronic text is provided. The electronic text includes an entity and a context of the entity. The device includes a main module, a semantic similarity calculation module, a character similarity calculation module and a presentation module. The main module includes a BERT module and a classification module. The BERT module is configured to generate a first vector (V2) based on a combination of the entity, the context, a type of the entity and a part of speech of the context. The classification module is configured to determine that the entity corresponds to one of multiple predefined concepts based on the first vector (V2), semantic similarity calculated by the semantic similarity calculation module and character similarity calculated by the character similarity calculation module, where the concept is in text form. The semantic similarity calculation module includes a BERT module and a graph convolutional neural network. The BERT module is configured to generate a second vector (V4) based on each of the multiple concepts. The graph convolutional neural network is configured to generate a third vector (V5) based on a graph, where the graph is generated based on the multiple concepts and relationships among the concepts. The semantic similarity calculation module is configured to generate a fourth vector (V6) by concatenating the second vector (V4) and the third vector (V5), and calculate a semantic similarity between the entity and each of the multiple concepts based on the first vector (V2) and the fourth vector (V6). The character similarity calculation module is configured to calculate a character similarity between the entity and each of the multiple concepts. The presentation module is configured to generate the prompt information to be presented to the user based on the determined concept corresponding to the entity.

According to another aspect of the present disclosure, a storage medium storing a computer program is provided. The computer program, when executed by a computer, causes the computer to perform the method described above.

DETAILED DESCRIPTION OF EMBODIMENTS

Figure 1:
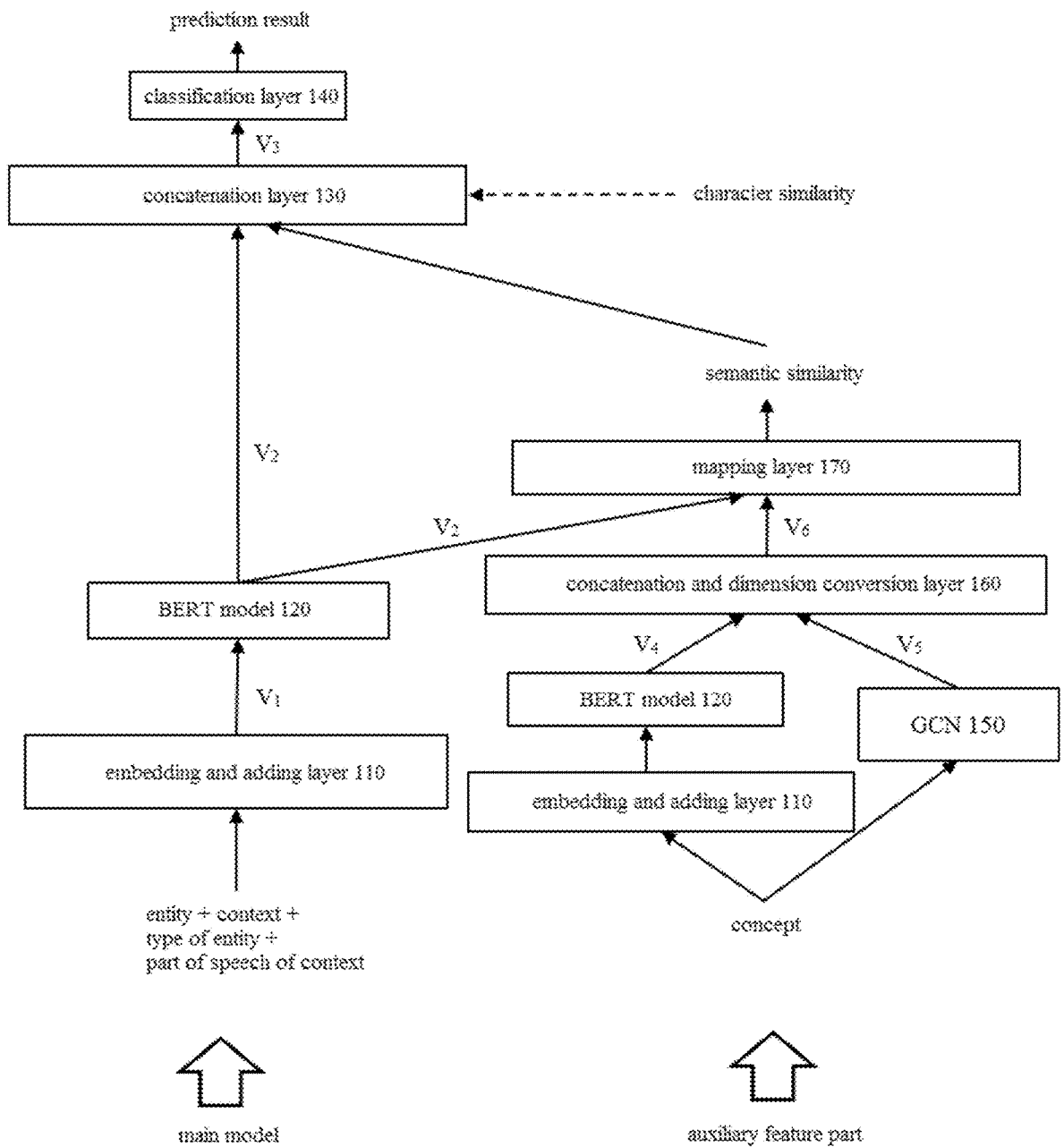
FIG. 1 schematically shows an architecture of a neural network according to the present disclosure.

FIG. 1 schematically shows architecture of a neural network according to the present disclosure. The left part of FIG. 1 shows a main model and the right part shows an auxiliary feature part. The main model mainly performs classification task, that is, to determine a concept (category) to which an entity included in a text belong. A conventional BERT (Bidirectional Encoder Representation from Transformers) model is adopted in the main model. In the neural network-based natural language processing, each word in the text is usually represented by a one-dimensional vector (referred to as "word vector"). The word vector is inputted into the BERT model, and a vector representation corresponding to the word in which full-text semantic information is fused is outputted. Thus, the BERT model may generate a semantic representation including rich semantic information for a text. Then, for a specific natural language processing task, the generated semantic representation for the text is fine-tuned to adapt to the specific task.

The main model and the auxiliary feature part according to the present disclosure are described below.

Figures 2, 3:
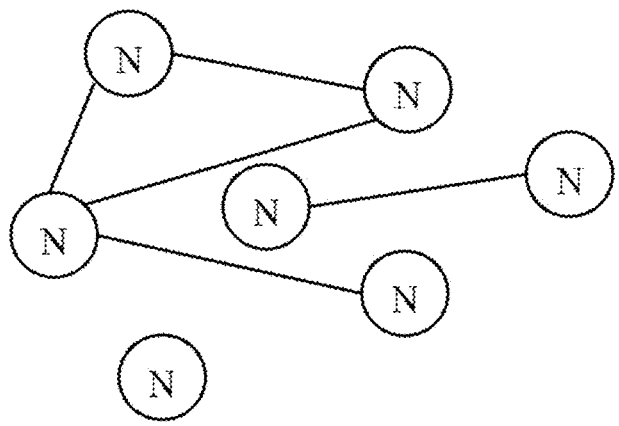
FIG. 2 shows a combination of an entity, a context, a type of the entity and a part of speech of the context.
FIG. 3 schematically shows a graph generated based on all concepts.

For an entity appearing in a text, a combination of the entity, a context, a type of the entity and a part of speech of the context are inputted to the main model. FIG. 2 schematically shows a specific form of the combination.

As shown in FIG. 2, the first row represents content of the text. A start mark [E] is added before the first character of the entity and an end mark [E/] is added after the last character. A text preceding the entity is placed before the start mark [E] and a text following the entity is placed after the end mark [E/]. In this way, the entity is matched to the context. Therefore, "M1, M2 . . . " represents a character string of the entity. "L1, L2 . . . " and "R1, R2 . . . " represent a character string of the text preceding the entity and a character string of the text following the entity, respectively.

In addition, the type of the entity and a part of speech of the context are marked with reference to dictionary resources. The dictionary resources include pre-defined part of speech dictionaries and entity type dictionaries. Parts of speech such as nouns, verbs, adverbs and adjectives are defined in the part of speech dictionaries. Various types of entities such as animals, companies, and games are defined in the entity type dictionaries. The second row in FIG. 2 shows the type of the entity Entity Type$_x$ and the part of speech POS$_i$ of the context that are determined with reference to the dictionary resources.

The content of text in the first row in FIG. 2 may be expressed as a two-dimensional vector [batch_size, document_token], where batch_size represents the number of inputted documents, and document_token represents a character ID sequence in each document. Similarly, the part of speech and entity type information in the second row may be expressed as a two-dimensional vector [batch_size, document_token].

Referring to FIG. 1, an embedding and adding layer 110 converts the inputted combination of the entity, the context, the type of the entity and the part of speech of the context into a non-sparse vector, and the non-sparse vector is inputted to a BERT model 120.

To be specific, the embedding and adding layer 110 converts the two-dimensional vector [batch_size, document_token] corresponding to the first row in FIG. 2 into [batch_size, document_token, embedding_dim], where embedding_dim represents dimension for embedding. Similarly, the embedding and adding layer 110 converts the two-dimensional vector [batch_size, document_token] corresponding to the second row in FIG. 2 into [batch_size, document_token, embedding_dim].

Then, according to equation (1), the embedding and adding layer 110 calculates a weighted sum of the vector corresponding to the first row and the vector corresponding to the second row to obtain a vector V1.

$$V_1 = \text{sigmoid}(W_1 X_1 + W_2 X_2) \quad (1)$$

In equation (1), sigmoid represents an activation function $\text{sigmoid}=1/(1+\exp(-x))$. $W_1$ and $W_2$ represent weights to be trained. $X_1$ and $X_2$ represent the converted vectors corresponding to the first row and the second row in FIG. 2 respectively.

The BERT model 120 receives the vector $V_1$ outputted by the embedding and adding layer 110, encodes the entity in the text, and extracts semantic information of the entity. Since the BERT model is known to those skilled in the art, it is not described in detail in the present disclosure. As described above, the vector $V_1$ [batch_size, document_token, embedding_dim] is inputted to the BERT model 120, and the BERT model 120 outputs the vector $V_2$ [batch_size, bert_dim], where bert_dim represents a dimension for a hidden layer of the BERT model 120, that is, a dimension for output.

A concatenation layer 130 receives the output $V_2$ of the BERT model 120 and concatenates $V_2$ with the auxiliary features which will be described in detail later. After the concatenation, the concatenation layer 130 outputs a vector $V_3$ [batch_size, bert_dim+2*class_dim], where class_dim represents the number of categories. The category corresponds to the concept in a knowledge map, and therefore class_dim also represents the number of pre-defined concepts in the knowledge map.

Subsequently, the output vector $V_3$ of the concatenation layer 130 is inputted to a classification layer 140. As an example, the classification layer 140 may be implemented with Softmax classifier. In the classification layer 140, the vector $V_3$ is first converted into One-Hot encoding form, and the converted dimension is [batch_size, class_dim]. Then the classification layer 140 generates a classification prediction result based on the converted vector. The prediction result indicates a probability that the entity in the text belongs to each of the concepts (categories) in the knowledge map, and the concept corresponding to the maximum probability is determined to be a concept to which the entity belongs.

In particular, the knowledge map in practice usually cannot include all existing concepts, but only include a limited number of concepts. Therefore, there may be a case that an entity does not belong to any concept in the knowledge map and it will be inappropriate to explain the meaning of the entity with any concept. In this case, it is possible to set a threshold. When the maximum probability in the prediction result is greater than the threshold, the concept corresponding to the maximum probability is determined to be the concept to which the entity belongs, and prompt information is generated based on content of the determined concept and presented to the user to help the user understand the correct meaning of the entity. On the other hand, when all the probabilities in the prediction result are less than the threshold, it means that the entity is not suitable to be classified into any concept. In this case, no prompt information is generated for the entity.

The auxiliary features are described in detail below. In the present disclosure, similarity features between the entity and the concepts are calculated as the auxiliary features to enhance performance of the model. Preferably, in order to reduce the amount of calculation, only the concepts in a preset knowledge map are selected. The similarity features include a character similarity and a semantic similarity. As an example, in the present disclosure, a BM25 similarity is used as the character similarity and a vector similarity based on neural network is used as the semantic similarity.

In a case that the BM25 similarity is used as the character similarity, the character similarity is calculated by calculating the BM25 similarity between an entity in the text and each of the concepts (in form of text) in the knowledge map. A vector with a dimension of [batch_size, class_dim] is obtained as the calculation result. BM25 algorithm (best match 25) is a text similarity algorithm known to those skilled in the art, therefore calculation of the BM25 similarity is not described in detail in the present disclosure.

In addition, with regard to the semantic similarity, a cosine similarity between the vector representation of the entity and a vector representation of each of the concepts in the knowledge map is calculated in the present disclosure. A vector with a dimension of [batch_size, class_dim] is obtained as the calculation result. Calculation of the semantic similarity is described in detail below.

Referring to the auxiliary feature part shown in the right part of FIG. 1, each concept in the knowledge map is processed by the embedding and addition layer 110 and the BERT model 120, and the BERT model 120 then outputs a vector $V_4$ representing a semantic feature of the concept. As shown in FIG. 1, the main model and the auxiliary feature part share the embedded and additive layer 110 and the BERT model 120.

In addition, a graph is generated based on all the concepts in the knowledge map. FIG. 3 shows an example of the generated graph. In FIG. 3, each node N represents a concept, and connections among the nodes represent correlation among the concepts.

A Laplace matrix is calculated with respect to the generated graph, and then the Laplace matrix is inputted to a graph convolution neural network (GCN) 150. The graph convolution neural network (GCN) is known to those skilled in the art and therefore is not described in detail in the present disclosure. The GCN 150 may output a vector representing an overall feature of all concepts. The overall feature indicates the relationships among the concepts. Since the concepts are related to one another as shown in the schematic diagram in FIG. 3, and the GCN 150 is capable of modeling the relationships among the concepts, the vector $V_5$ generated by GCN 150 includes the relationships among the concepts. A dimension of the vector $V_5$ is [batch_size, graph_dim], where graph_dim represents a dimension for the output layer of GCN 150.

Then, the output vector $V_4$ of the BERT model 120 and the output vector $V_5$ of the GCN 150 are inputted to a concatenation and dimension conversion layer 160. The concatenation and dimension conversion layer 160 concatenates the vectors $V_4$ and $V_5$ and performs dimension conversion on the vectors $V_4$ and $V_5$, to output a vector $V_6$ with a dimension of [batch_size, bert_dim]. It should be noted that the vector $V_6$ is a vector representation of a concept in the knowledge map.

In addition, as described above, in the main model shown in the left part of FIG. 1, the BERT model 120 produces the vector representation $V_2$ for the inputted entity. Then, the semantic similarity between the entity and the concept is calculated based on the vector representation $V_2$ of the entity outputted by the BERT model 120 in the main model and the vector representation $V_6$ of the concept outputted by the concatenation and dimension conversion layer 160.

Preferably, the vector $V_2$ and the vector $V_6$ are inputted to the mapping layer 170. The mapping layer 170 is used to map the vector $V_2$ and the vector $V_6$ to the same vector space for subsequent determination of the similarity between the vector $V_2$ and the vector $V_6$. The mapping layer 170 is essentially a fully connected layer with a hidden layer, which maps the inputted vectors to the same vector space according to equation (2):

$$Y = \text{sigmoid}(WX+b) \quad (2)$$

In equation (2), sigmoid represents an activation function sigmoid=1/(1+exp(−x)). W and b represent weights to be trained. X represents the inputted vector $V_2$ or $V_6$, with a dimension of [batch_size, bert_dim]. Y represents the mapped vector with a dimension of [batch_size, trans dim], where trans dim is a dimension of the vector of the entity and the vector of the concept which have been mapped to the same vector space.

Next, a cosine similarity is calculated according to equation (3) as the semantic similarity:

$$\text{sim\_cos} = \cos\langle x_1, x_2 \rangle = \frac{x_1 \cdot x_2}{\|x_1\| \cdot \|x_2\|} \quad (3)$$

In equation (3), $x_1$ and $x_2$ respectively represent the vector representation of the entity and the vector representation of the concept. In particular, in a case that the mapping layer 170 is used, $x_1$ and $x_2$ respectively represent the mapped vector representation of the entity and the mapped vector representation of the concept.

The character similarity and the semantic similarity, which act as auxiliary features, have been obtained. As described above with respect to the main model, the auxiliary features and the output vector $V_2$ of the BERT model 120 are inputted to the concatenation layer 130 to perform subsequent processing.

The training process for the model according to the present disclosure is described below. In the training, a training data set which includes a text and a knowledge map is inputted to the model shown in FIG. 1. The text includes an entity and context of the entity, and the knowledge map includes a number of predefined concepts. The model generates a classification prediction result for the entity, which indicates a concept to which the entity belongs.

The model is trained based on the predicted concept and ground truth according to loss functions (for example, cross entropy loss function), so as to obtain optimal parameters of the model. In the training, initial parameters of the BERT model 120 may be set as parameters of the pre-trained BERT model. However, those skilled in the art may also perform the training using any other known method, which is not limited in the present disclosure.

When the training is completed, the trained model can be used to predict a specific concept to which the entity mentioned in the text correspond. Then, prompt information may be generated based on content of the predicted concept and presented to the user, to help the user understand the correct meaning of the entity. The prompt information may be provided in various manners (for example, visual, auditory). As an example, when the user is browsing a document, meaning of an entity may be prompted to the user through a hyperlink or a pop-up window. Alternatively, the user may be prompted through sound.

Figure 4:
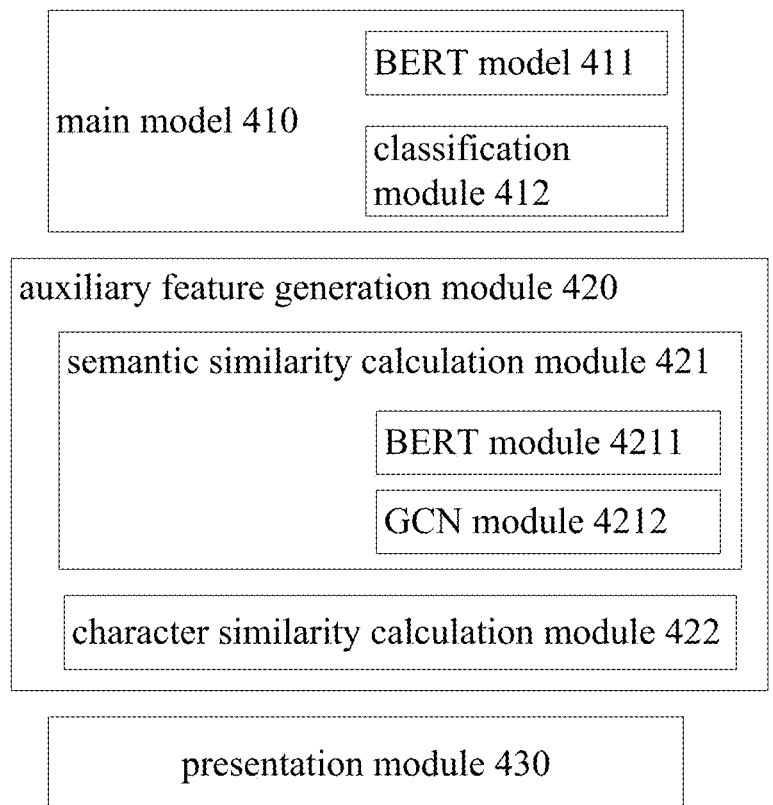
FIG. 4 is a diagram showing modules of a device for presenting prompt information about an entity to a user according to the present disclosure.
Figure 5:
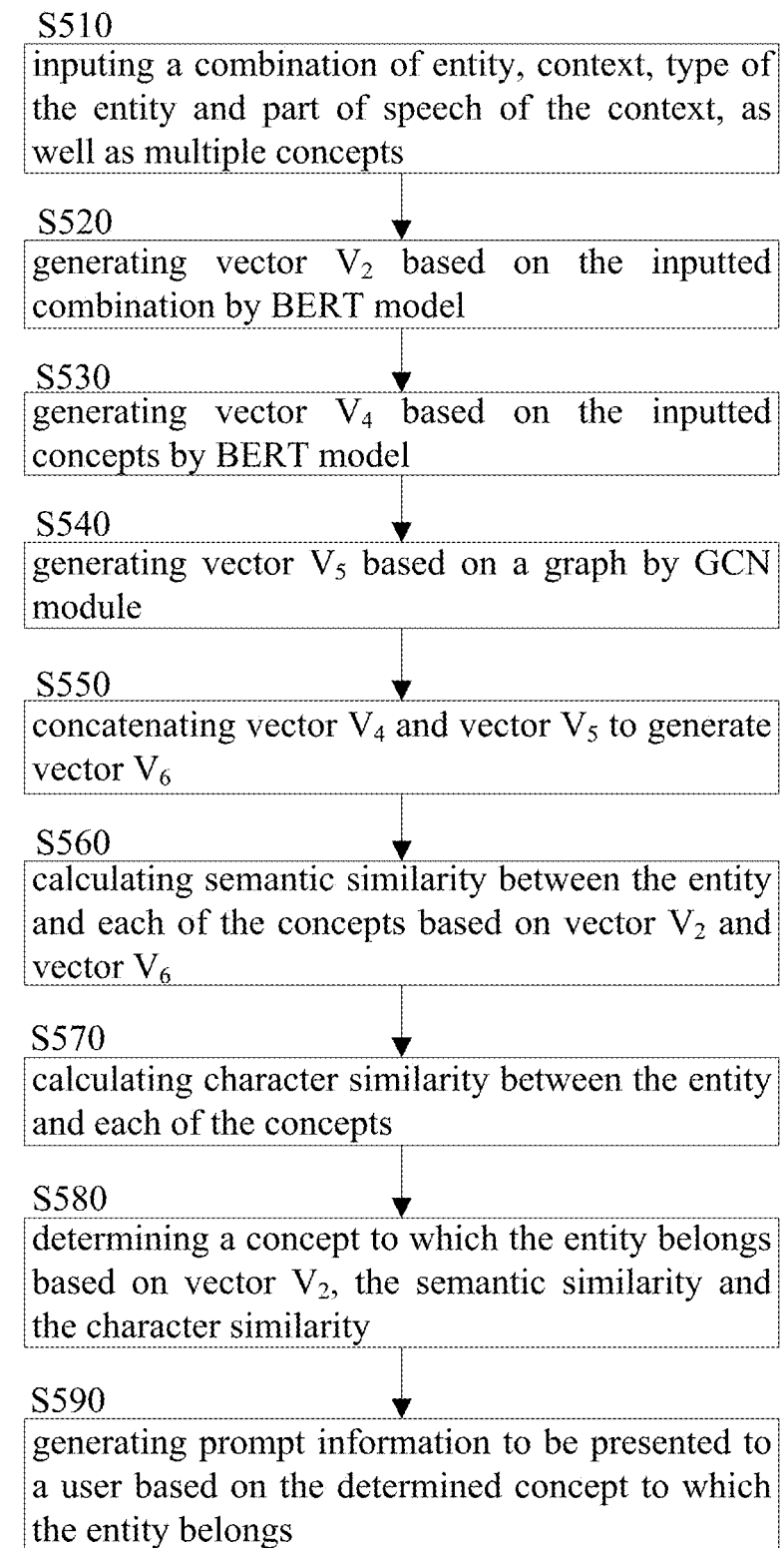
FIG. 5 is a flowchart of a method of presenting prompt information about an entity to a user according to the present disclosure.

FIG. 4 schematically shows modules of a device for presenting prompt information to a user according to the present disclosure. FIG. 5 is a flowchart of a method of presenting prompt information to a user according to the present disclosure.

Referring to FIG. 4 and FIG. 5, the device according to the present disclosure includes a main module 410, an auxiliary feature generation module 420, and a presentation module 430. In step S510, a combination of an entity, a context, a type of the entity and a part of speech of the context is inputted to the main module 410 (as shown in FIG. 2), and a number of predefined concepts are inputted to the auxiliary feature generation module 420.

The main module 410 includes a BERT module 411 and a classification module 412. In step S520, the BERT module 411 generates the vector $V_2$ based on the inputted combination of the entity, the context, the type of the entity and the part of speech of the context.

The auxiliary feature generation module 420 includes a semantic similarity calculation module 421 and a character similarity calculation module 422. The semantic similarity calculation module 421 includes a BERT module 4211 and a graph convolution neural network (GCN) module 4212. It should be noted that the BERT module 4211 in the auxiliary feature generation module 420 and the BERT module 411 in the main module 410 may be the same module and has the same function. However, different reference signs will be used to represent them for clarity.

In step S530, the BERT module 4211 generates the vector $V_4$ based on each of the inputted concepts. In step S540, a graph is generated based on the multiple inputted concepts and relationship among the concepts, and the GCN module 4212 generates the vector $V_5$ based on the generated graph. The vector $V_5$ represents an overall feature of the multiple concepts, which indicates the relationship among the concepts.

Then, the semantic similarity calculation module 421 concatenates the generated vector $V_4$ and vector $V_5$ to generate the vector $V_6$ (in step S550), and calculates the semantic similarity between the entity and each concept based on the vector $V_2$ and the vector $V_6$ according to equation (3) (in step S560). Preferably, the semantic similarity may be calculated after the vector $V_2$ and the vector $V_6$ have been mapped to the same vector space.

In step S570, the character similarity calculation module 422 calculates the character similarity between the entity and each concept.

In step S580, the classification module 412 generates a classification prediction result based on the vector $V_2$ generated by the BERT module 411 and the semantic similarity and the character similarity calculated by the auxiliary feature generation module 420. The prediction result indicates a probability that the entity belongs to each of the concepts, and a concept corresponding to the maximum probability is determined to be the concept to which the entity belongs.

In step S590, the presentation module 430 generates prompt information based on the determined concept to which the entity belongs, and presents the prompt information to the user. Preferably, the presentation module 430 may present the prompt information in visual and/or auditory manner.

It should be noted that the method according to the present disclosure does not have to be performed in the order shown in FIG. 5, but can also be performed in a different order as long as it is technically possible. For example, step S570 of calculating the character similarity may be performed before the semantic similarity is calculated.

The model and the method according to the present disclosure have been described in detail in combination with the above embodiments. A new classification model-based entity disambiguation solution is provided in the present disclosure, in which the BERT model is employed and the character similarity and the semantic similarity are used as auxiliary features. In addition, in the present disclosure, the type of the entity and the part of speech of the context are used for semantic enhancement, thereby effectively utilizing the dictionary resource information and improving the performance of the model. Moreover, in the present disclosure, the graph convolution neural network (GCN) extracts the overall feature with respect to the graph formed by all the concepts, so that information contained in other concepts in the knowledge map may be integrated into the current concept, thereby making the semantic information contained in the current concept more complete.

The method described in the above embodiments may be implemented by software, hardware, or a combination of software and hardware. A program included in the software may be stored in a storage medium provided inside or outside the device in advance. As an example, the program, when being executed, is written into a random access memory (RAM) and executed by a processor (for example, CPU), so as to implement the various methods and processes described herein.

Figure 6:
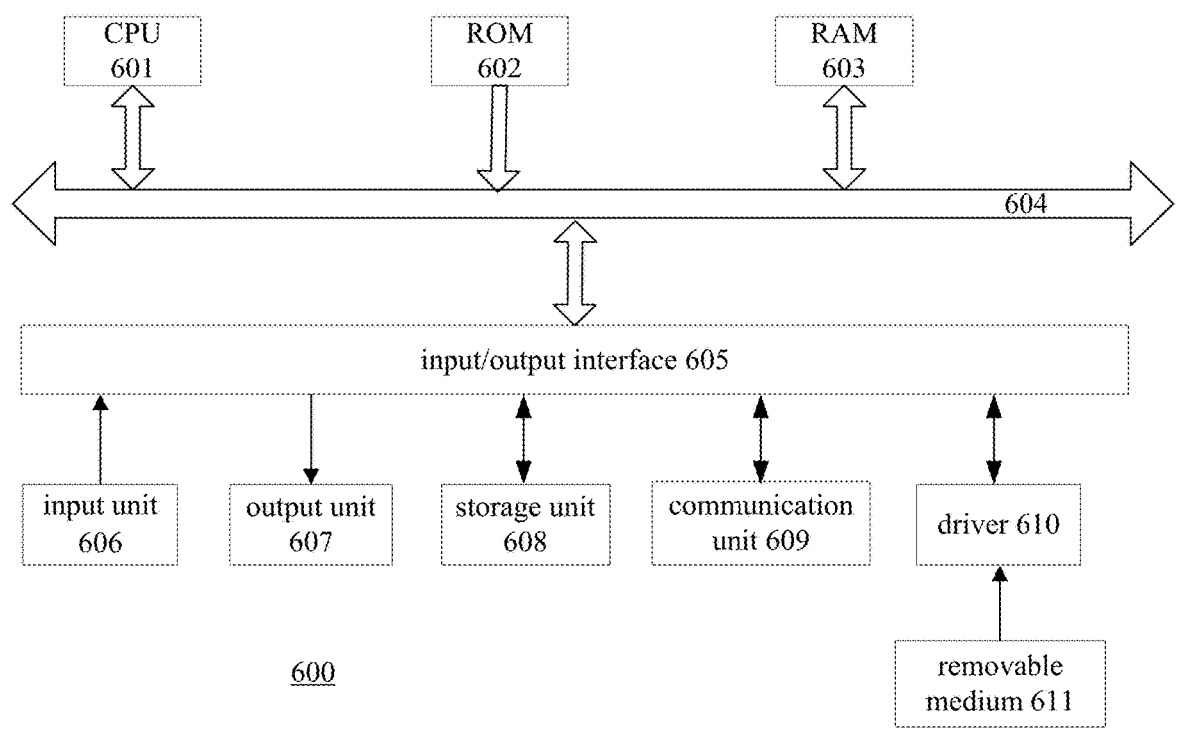
FIG. 6 is block diagram of an exemplary configuration of computer hardware for implementing the present disclosure.

FIG. 6 is block diagram of an exemplary configuration of computer hardware for implementing the method described in the present disclosure according to a program. The computer hardware is an example of a device for presenting prompt information to a user who is viewing a text according to the present disclosure.

As shown in FIG. 6, in a computer 600, a central processing unit (CPU) 601, a read only memory (ROM) 602, and a random access memory (RAM) 603 are connected to each other through a bus 604.

An input/output interface 605 is further connected to the bus 604. The input/output interface 605 is connected to the following components: an input unit 606 configured with a keyboard, a mouse, a microphone and the like; an output unit 607 configured with a display, a speaker and the like; a storage unit 608 configured with a hard disk, a nonvolatile memory and the like; a communication unit 609 formed by a network interface card (such as local area network (LAN) card and modem); and a driver 610 driving a removable medium 611. The removable medium 611 may be for example a magnetic disk, an optical disk, a magneto-optical disk, or a semiconductor memory.

In the computer having such structure, the CPU 601 loads the program stored in the storage unit 608 into the RAM 603 through the input/output interface 605 and the bus 604, and executes the program to perform the method described above.

A program to be executed by the computer (CPU 601) may be recorded in the removable medium 611 which may be a packaged medium. The packaged medium for example may be implemented by a magnetic disk (including floppy disk), an optical disk (including compressed optical disk-read only memory (CD-ROM)), digital versatile optical disk (DVD), and the like), a magneto-optical disk, or a semiconductor memory. In addition, the program to be executed by the computer (CPU 601) may also be provided through a wired or wireless transmission medium such as local area network, Internet, or digital satellite broadcasting.

In a case that the removable medium 611 is installed in the drive 610, the program may be installed in the storage unit 608 through the input/output interface 605. In addition, the program may be received by the communication unit 609 through a wired or wireless transmission medium and installed in the storage unit 608. Alternatively, the program may be pre-installed in the ROM 602 or the storage unit 608.

The programs executed by the computer may be executed in the order described in the present disclosure, or may be executed in parallel or when needed (for example, when called).

The units or devices described in the present disclosure are only logical and do not strictly correspond to physical devices or entities. For example, functions of each unit described herein may be implemented by multiple physical entities, or the functions of multiple units described herein may be implemented by a single physical entity. In addition, features, components, elements, steps, and the like described in an embodiment are not limited to the embodiment, but may also be applied to another embodiment. For example, certain features, components, elements, steps, and the like in the other embodiment may be replaced or combined with them.

The scope of the present disclosure is not limited to the embodiments described herein. It should be understood by those skilled in the art that various modifications or variations may be made to the embodiments herein depending on design requirements and other factors, without departing from the principle of the present disclosure. The scope of the present disclosure is defined by the appended claims and equivalents thereof.

APPENDIX (1) A computer-implemented method of presenting prompt information to a user who is viewing an electronic text by utilizing a neural network, wherein the neural network includes a BERT model and a graph convolutional neural network, and the method includes:
  inputting the electronic text, information related to the electronic text and multiple predefined concepts to the neural network, wherein the electronic text includes an entity and a context of the entity, the information related to the electronic text includes a type of the entity and a part of speech of the context, and the concept is in text form;
  generating a first vector (V2) based on a combination of the entity, the context, the type of the entity and the part of speech of the context by using the BERT model;

generating a second vector (V4) based on each of the multiple concepts by using the BERT model;
generating a third vector (V5) based on a graph by using the graph convolutional neural network, wherein the graph is generated based on the multiple concepts and relationships among the concepts;
generating a fourth vector (V6) by concatenating the second vector (V4) and the third vector (V5);
calculating a semantic similarity between the entity and each of the multiple concepts based on the first vector (V2) and the fourth vector (V6);
determining, based on the first vector (V2) and the semantic similarity, that the entity corresponds to one of the multiple concepts; and
generating the prompt information to be presented to the user based on the determined concept corresponding to the entity.

(2) The method according to (1), further including:
calculating a character similarity between the entity and each of the multiple concepts; and
determining the concept to which the entity corresponds based on the first vector, the semantic similarity and the character similarity.

(3) The method according to (2), wherein the semantic similarity is a cosine similarity calculated based on the first vector (V2) and the fourth vector (V6), and the character similarity is BM25 similarity between the entity and each of the multiple concepts.

(4) The method according to (1), further including:
combining the entity, the context, the type of the entity and the part of speech of the context by a weighted sum of a vector to which the entity and the context correspond and a vector to which the type of the entity and the part of speech of the context correspond.

(5) The method according to (1), wherein the third vector (V5) represents an overall feature for the multiple concepts, and the overall feature indicates the relationships among the concepts.

(6) The method according to (1), wherein the first vector (V2) and the fourth vector (V6) are mapped to a same vector space prior to the calculation of the semantic similarity.

(7) The method according to (1), further including:
determining a probability that the entity corresponds to each of the multiple concepts, based on the first vector, the semantic similarity and the character similarity;
determining the concept related to a maximum probability among determined probabilities as the concept to which the entity corresponds in a case that the maximum probability is greater than a predetermined threshold; and
generating no prompt information for the entity in a case that each of the determined probabilities is less than the predetermined threshold.

(8) The method according to claim (1), wherein the prompt information is presented to the user in at least one of a visual manner and an auditory manner.

(9) A device for presenting prompt information to a user who is viewing an electronic text by utilizing a neural network, wherein the neural network includes a BERT model and a graph convolutional neural network, and the device includes:
a memory storing a computer program; and
one or more processors executing the computer program to perform operations of:
inputting the electronic text, information related to the electronic text and multiple predefined concepts to the neural network, wherein the electronic text includes an entity and a context of the entity, the information related to the electronic text includes a type of the entity and a part of speech of the context, and the concept is in text form;
generating a first vector (V2) based on a combination of the entity, the context, the type of the entity and the part of speech of the context by using the BERT model;
generating a second vector (V4) based on each of the multiple concepts by using the BERT model;
generating a third vector (V5) based on a graph by using the graph convolutional neural network, wherein the graph is generated based on the multiple concepts and relationships among the concepts;
generating a fourth vector (V6) by concatenating the second vector (V4) and the third vector (V5);
calculating a semantic similarity between the entity and each of the multiple concepts based on the first vector (V2) and the fourth vector (V6);
determining, based on the first vector (V2) and the semantic similarity, that the entity corresponds to one of the multiple concepts; and
generating the prompt information to be presented to the user based on the determined concept corresponding to the entity.

(10) A device for presenting prompt information to a user who is viewing an electronic text, wherein the electronic text includes an entity and a context of the entity, and the device includes a main module, a semantic similarity calculation module, a character similarity calculation module and a presentation module, wherein
the main module includes:
a BERT module configured to generate a first vector (V2) based on a combination of the entity, the context, a type of the entity and a part of speech of the context; and
a classification module configured to determine that the entity corresponds to one of multiple predefined concepts based on the first vector (V2), semantic similarity calculated by the semantic similarity calculation module and character similarity calculated by the character similarity calculation module, wherein the concept is in text form;
the semantic similarity calculation module includes:
a BERT module configured to generate a second vector (V4) based on each of the multiple concepts; and
a graph convolutional neural network configured to generate a third vector (V5) based on a graph, wherein the graph is generated based on the multiple concepts and relationships among the concepts;
the semantic similarity calculation module is configured to generate a fourth vector (V6) by concatenating the second vector (V4) and the third vector (V5), and calculate a semantic similarity between the entity and each of the multiple concepts based on the first vector (V2) and the fourth vector (V6);
the character similarity calculation module is configured to calculate a character similarity between the entity and each of the multiple concepts; and
the presentation module is configured to generate the prompt information to be presented to the user based on the determined concept corresponding to the entity.

(11). A storage medium storing a computer program that, when executed by a computer, causes the computer to perform the method for presenting prompt information to a user according to any one of (1) to (8).

The invention claimed is:

1. A computer-implemented method of presenting prompt information to a user who is viewing an electronic text by utilizing a neural network, wherein the neural network comprises a Bidirectional Encoder Representations and Transformers (BERT) model and a graph convolutional neural network, and the method comprises:
inputting the electronic text, information related to the electronic text and a plurality of predefined concepts to the neural network, wherein the electronic text comprises an entity and a context of the entity, the information related to the electronic text comprises a type of the entity and a part of speech of the context, and the concept is in text form;
generating a first vector based on a combination of the entity, the context, the type of the entity and the part of speech of the context by using the BERT model;
generating a second vector based on each of the plurality of concepts by using the BERT model;
generating a third vector based on a graph by using the graph convolutional neural network, wherein the graph is generated based on the plurality of concepts and relationships among the concepts;
generating a fourth vector by concatenating the second vector and the third vector;
calculating a semantic similarity between the entity and each of the plurality of concepts based on the first vector and the fourth vector;
determining, based on the first vector and the semantic similarity, that the entity corresponds to one of the plurality of concepts; and
generating the prompt information to be presented to the user based on the determined concept corresponding to the entity.

2. The method according to claim 1, further comprising:
calculating a character similarity between the entity and each of the plurality of concepts; and
determining the concept to which the entity corresponds based on the first vector, the semantic similarity and the character similarity.

3. The method according to claim 2, wherein the semantic similarity is a cosine similarity calculated based on the first vector and the fourth vector, and the character similarity is BM25 similarity between the entity and each of the plurality of concepts.

4. The method according to claim 1, further comprising:
combining the entity, the context, the type of the entity and the part of speech of the context by a weighted sum of a vector to which the entity and the context correspond and a vector to which the type of the entity and the part of speech of the context correspond.

5. The method according to claim 1, wherein the third vector represents an overall feature for the plurality of concepts, and the overall feature indicates the relationships among the concepts.

6. The method according to claim 1, wherein the first vector and the fourth vector are mapped to a same vector space prior to the calculation of the semantic similarity.

7. The method according to claim 2, further comprising:
determining a probability that the entity corresponds to each of the plurality of concepts, based on the first vector, the semantic similarity and the character similarity;
determining the concept related to a maximum probability among determined probabilities as the concept to which the entity corresponds, when the maximum probability is greater than a predetermined threshold; and
generating no prompt information for the entity when each of the determined probabilities is less than the predetermined threshold.

8. The method according to claim 1, wherein the prompt information is presented to the user in at least one of a visual manner and an auditory manner.

9. A device for presenting prompt information to a user who is viewing an electronic text by utilizing a neural network, wherein the neural network comprises a Bidirectional Encoder Representations and Transformers (BERT) model and a graph convolutional neural network, and the device comprises:
a memory storing a computer program; and
one or more processors executing the computer program to perform operations of:
inputting the electronic text, information related to the electronic text and a plurality of predefined concepts to the neural network, wherein the electronic text comprises an entity and a context of the entity, the information related to the electronic text comprises a type of the entity and a part of speech of the context, and the concept is in text form;
generating a first vector based on a combination of the entity, the context, the type of the entity and the part of speech of the context by using the BERT model;
generating a second vector based on each of the plurality of concepts by using the BERT model;
generating a third vector based on a graph by using the graph convolutional neural network, wherein the graph is generated based on the plurality of concepts and relationships among the concepts;
generating a fourth vector by concatenating the second vector and the third vector;
calculating a semantic similarity between the entity and each of the plurality of concepts based on the first vector and the fourth vector;
determining, based on the first vector and the semantic similarity, that the entity corresponds to one of the plurality of concepts; and
generating the prompt information to be presented to the user based on the determined concept corresponding to the entity.

10. A non-transitory machine readable storage medium storing a computer program that, when executed by a computer, causes the computer to perform the method of presenting prompt information to a user according to claim 1.

11. A non-transitory machine readable storage medium storing a computer program that, when executed by a computer, causes the computer to perform the method of presenting prompt information to a user according to claim 2.

12. A non-transitory machine readable storage medium storing a computer program that, when executed by a computer, causes the computer to perform the method of presenting prompt information to a user according to claim 3.

13. A non-transitory machine readable storage medium storing a computer program that, when executed by a computer, causes the computer to perform the method of presenting prompt information to a user according to claim 4.

14. A non-transitory machine readable storage medium storing a computer program that, when executed by a computer, causes the computer to perform the method of presenting prompt information to a user according to claim 5.

15. A non-transitory machine readable storage medium storing a computer program that, when executed by a computer, causes the computer to perform the method of presenting prompt information to a user according to claim 6.

16. A non-transitory machine readable storage medium storing a computer program that, when executed by a computer, causes the computer to perform the method of presenting prompt information to a user according to claim 7.

17. A non-transitory machine readable storage medium storing a computer program that, when executed by a computer, causes the computer to perform the method of presenting prompt information to a user according to claim 8.

18. The device according to claim 9, wherein the one or more processors executing the computer program to perform operations of:
    calculating a character similarity between the entity and each of the plurality of concepts; and
    determining the concept to which the entity corresponds based on the first vector, the semantic similarity and the character similarity.

19. The device according to claim 18, wherein the one or more processors executing the computer program to perform operations of:
    determining a probability that the entity corresponds to each of the plurality of concepts, based on the first vector, the semantic similarity and the character similarity;
    determining the concept related to a maximum probability among determined probabilities as the concept to which the entity corresponds, when the maximum probability is greater than a predetermined threshold; and
    generating no prompt information for the entity when each of the determined probabilities is less than the predetermined threshold.

20. The device according to claim 18, wherein the one or more processors executing the computer program to perform operations of:
    combining the entity, the context, the type of the entity and the part of speech of the context by a weighted sum of a vector to which the entity and the context correspond and a vector to which the type of the entity and the part of speech of the context correspond.

* * * * *